United States Patent [19]

Paeglis

[11] Patent Number: 4,480,062

[45] Date of Patent: Oct. 30, 1984

[54] ELASTOMERIC COMPOSITION

[75] Inventor: Arnis U. Paeglis, Woodbury, Conn.

[73] Assignee: Uniroyal, Inc., New York, N.Y.

[21] Appl. No.: 479,376

[22] Filed: Mar. 28, 1983

[51] Int. Cl.³ .............................................. C08K 5/09
[52] U.S. Cl. .................... 524/394; 524/399; 524/400
[58] Field of Search ......................................... 524/394

[56] References Cited

U.S. PATENT DOCUMENTS

| | | | |
|---|---|---|---|
| 4,157,992 | 6/1979 | Lundberg et al. | 524/394 |
| 4,193,899 | 3/1980 | Brenner et al. | 524/394 |
| 4,277,381 | 7/1981 | Bock et al. | 524/394 |
| 4,387,174 | 6/1983 | Lundberg et al. | 524/394 |

Primary Examiner—Joseph L. Schofer
Assistant Examiner—N. Sarofim
Attorney, Agent, or Firm—Marvin Bressler

[57] ABSTRACT

A composition, extrudable or calenderable into a membrane, comprising 100 parts by weight of a neutralized sulfonated elastomeric polymer, 40 to 250 parts of a non-polar process oil, 5 to 50 parts of a preferential plasticizer selected from the group consisting of a basic salt of a carboxylic acid and an organic amide and at least 65 parts of carbon black. The membrane, made in accordance with the composition of this invention, has particular application as a roof covering.

26 Claims, No Drawings

ELASTOMERIC COMPOSITION

BACKGROUND OF THE DISCLOSURE

1. Field of the Invention

The instant invention is directed to a composition, processable into waterproofing membranes, having outstanding tear and weather resistance. More particularly, the instant invention is directed to an extrudable and calenderable elastomeric composition having high tear and weather resistance useful as a roofing membrane.

2. Description of the Prior Art

In recent years, a new class of elastomeric sulfonated polymers have been developed. These polymers are derived from polymeric materials having olefinic unsaturation, especially elastomeric polymers such as EPDM rubber. U.S. Pat. No. 3,642,728, incorporated herein by reference, teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer are readily neutralized with a basic material to form an ionically crosslinked elastomer having substantially improved physical properties over the corresponding unsulfonated elastomer at room temperature. However, these ionically crosslinked elastomers may be processed like a conventional thermoplastic at elevated temperatures under shear force in the presence of selected preferential plasticizers which dissipate the ionic associations at the elevated temperatures thereby creating a reprocessable elastomer.

The basic materials used as neutralizing agents are selected from organic amines or metallic bases in which the metal ion is selected from Groups I, II, III, IV, V, VIB, VIIB and VIII of the Periodic Table of Elements and mixtures thereof.

Further development of these sulfonated polymers is provided in U.S. Pat. No. 3,836,511, incorporated herein by reference, which teaches an improved process for the sulfonation of the olefinic sites of the elastomeric polymer. The patent discloses the use of an improved sulfonating agent selected from acetyl sulfate, propionyl sulfate and butyryl sulfate. The neutralizing agents employed to neutralize the acid form of the sulfonated elastomeric polymers are organic amines.

A still further development in this class of elastomeric sulfonated polymers is provided by U.S. Pat. No. 3,870,841, also incorporated herein by reference. This patent teaches a method of plasticization of the polymeric backbone of a neutralized sulfonated polymer by means of a polymer chain plasticizer which is a liquid compound having a boiling point of at least about 120° F. The polymer chain plasticizer is selected from a dialkyl phthalate, a process oil or an organic ester.

A yet further development in elastomeric sulfonated polymers is disclosed in U.S. Pat. No. 3,847,854, incorporated herein by reference. This patent teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. An example of an effective preferential plasticizer, as will be discussed hereinafter, is zinc stearate.

A still more recent improvement in sulfonated polymers is supplied by U.S. Pat. No. 4,222,914, incorporated herein by reference. U.S. Pat. No. 4,222,914 discloses an improved process for the sulfonation of olefinic sites on an elastomeric polymer and subsequent neutralization of the resulting polymer sulfonic acid to form a zinc sulfonate. The patent describes the reaction of a cement of the polymer with an acyl sulfate followed by neutralization with a solution of zinc acetate dissolved in methanol or an aqueous methanol solution.

Products resulting from the aforementioned methods for obtaining neutralized sulfonated elastomeric compositions possess either unsuitable rheological or physical properties necessary for the application of the present invention.

The present composition is directed to an application to which elastomeric products have recently been introduced. That is, the composition of this invention is proposed for use as a roof covering. Quite recently elastomeric extruded or calendered products have been developed for use in this market. When formulated with proper additives, certain thermosetting elastomeric compositions possess the excellent flexibility and weather resistance necessary for leak free, long term use. EPDM rubber, a thermosetting rubber, has been found to be useful as a roof covering. It possesses the proper degree of flexibility and weather resistance necessary for use in this application. However, thermosetting rubbers, such as EPDM, which possess the necessary flexibility and weather resistance, are difficult to install on a roof.

Installation requires seaming of the roofing panels on site to provide a continuous, leak free roofing surface. Since EPDM is a thermoset rubber, it cannot be heat sealed. Instead it is necessary to use adhesives to bind the seams. Not only are such adhesives expensive, but, more importantly, are time consuming to apply and are subject to delamination under stressful situations often encountered in roofing applications. Obviously, delamination results in leakage, i.e., roof failure.

On the other hand, the elastomeric sulfonated polymers discussed above are easy to handle. They, unlike thermosetting rubbers, can be heat sealed, thus negating the need for adhesives, so easily cover a roof. However, just as the products of the aforementioned patents are inadequate for use as a roofing composition, so too are the other disclosures in the prior art directed to elastomeric sulfonated polymers. None of them possess the properties necessary for a successful roofing material. Neither do any of the elastomeric sulfonated polymers of the prior art incorporate the combination of flexibility, weather resistance and tear resistance, properties necessary to produce a long lasting roof covering. Indeed, none of the disclosures of elastomeric sulfonated polymers in the prior art specifically disclose a composition useful as a roof covering. Moreover, none of them recite an elastomeric sulfonated composition whose constituents and concentrations would produce, when extruded or calendered, a membrane of the type required to cover roofs.

U.S. Pat. No. 4,157,992 discloses a composition which incorporates fillers and carbon black. However, this reference does not provide a composition of the type necessary for use as a roofing membrane. The composition of the '992 patent is recited as useful in the manufacture of footwear and garden hose. There is no disclosure or suggestion that the composition of this patent could be used as a roofing membrane.

U.S. Pat. No. 4,118,353 discloses a sulfonated elastomeric polymer which includes, as a necessary component, hydroxy alkyl carboxylate ester. This composition is recited to include a filler which may be carbon black and/or a mineral filler. In addition, the filler is recited to have a particle size range of between 0.03 and 20 microns. The composition of this invention does not include an hydroxy alkyl carboxylate ester. Moreover, the filler of the present invention is solely or substantially all carbon black.

It is important to note that hydroxy alkyl carboxylate ester can have deleterious effects on a sulfonated elastomeric polymer used as a roofing membrane. A roof covering is, of course, subject to elevated temperatures. The carboxylate ester at elevated temperatures can interact with the polymer to diminish its properties. Even at moderate temperatures the ester can bloom to the surface. This blooming diminishes heat sealability and adversely affects surface aesthetics.

BRIEF SUMMARY OF THE INVENTION

The instant invention is directed to an elastomeric composition extrudable or calenderable into a membrane. This membrane has the advantages of a thermoplastic, in that it may be reprocessed, yet possesses the weather and tear resistance of a thermosetting elastomer. Furthermore, a membrane extruded or calendered from the elastomeric composition of this invention is heat sealable eliminating the need for adhesives. This permits the fabrication of coverings having excellent structural integrity important in such applications as roof coverings, pond liners, pit liners and the like wherein tears can result in failure of the covering to perform its function.

In accordance with the instant invention as elastomeric composition is provided. It includes 100 parts by weight of a neutralized sulfonated elastomeric polymer having 10–50 milliequivalents of neutralized sulfonate groups per 100 grams of said elastomeric polymer, said sulfonate groups containing an ammonium cation or a metal cation selected from the group consisting of antimony, aluminum, iron, lead and a metal of Group IA, IIA, IB or IIB of the Periodic Table of Elements and mixtures thereof. The composition also comprises 40 to 250 parts by weight of a non-polar process oil. Also included in the composition is 5 to 50 parts by weight of a preferential plasticizer. This plasticizer is selected from the group consisting of a basic salt of a carboxylic acid having from 2 to 30 carbon atoms wherein a cation of said basic salt is selected from the group consisting of antimony, aluminum, iron, lead and a metal of Group IA, IIA, IB or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group $-CH_2CH_2NHCOR^1$, and where at least one of $R^1$, $R^2$ and $R^3$ has at least 5 carbon atoms. The composition further includes at least 65 parts by weight of carbon black.

DETAILED DESCRIPTION

The instant invention is directed to a novel composition of a neutralized sulfonated elastomeric polymer, a non-polar process oil, carbon black and a preferential plasticizer. The resultant composition is processable by conventional extrusion and calendering operations into a weather and tear resistant elastomeric article, especially a roofing membrane. The resultant elastomeric article may also be employed in other applications requiring leaf proof flexible shaped articles such as pond liners and the like.

The neutralized sulfonated elastomeric polymer of this invention is derived from a low unsaturated elastomeric polymer. A low unsaturated elastomeric polymer preferred for use in this invention is EPDM. EPDM terpolymers are unsaturated polymers containing ethylene, propylene and a non-conjugated diene in which the unreacted double bond of the diene is present in a side chain. In a preferred embodiment, the non-conjugated diene monomer, which may be used in the EPDM terpolymer, is selected from the group consisting of 1,4-hexadiene, dicyclopentadiene and 5-ethylidene-2-norbornene. One method by which the EPDM terpolymer is produced is found in U.S. Pat. No. 3,341,503 which is incorporated herein by reference.

The EPDM polymers used in the formation of the neutralized sulfonated elastomeric polymer contain between 40 and 80 weight percent ethylene and between 1 and 10 percent non-conjugated diene monomer. The balance of the polymer is propylene. More preferably, the EPDM polymer contains between 50 and 70 weight percent ethylene and between 2 and 7 weight percent non-conjugated diene monomer. The EPDM elastomer polymer has a Mooney viscosity (ML-4, 100° C.) of less than 60 although higher molecular weight EPDM polymers may be used. At a Mooney viscosity of less than 60 (ML-4, 100° C.) solubility is optimized.

In another preferred embodiment the low unsaturated elastomeric polymer is Butyl rubber. "Butyl rubber" is a term commonly used to describe copolymers made from a polymerization reaction mixture having therein from 70 to 99.5% by weight of an isoolefin which has 4 to 7 carbon atoms, e.g. isobutylene, and 0.5 to 30% by weight of a conjugated multiolefin having from 4 to 14 carbon atoms, e.g. isoprene. The resulting copolymer contains 85 to 99.8% by weight of combined isoolefin and 0.2 to 15% by weight of combined multiolefin.

Butyl rubber generally has a Staudinger molecular weight of 20,000 to 500,000, preferably 25,000 to 400,000, especially 100,000 to 400,000, and a Wijs Iodine No. of 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from 0.2 to 10% of combined multiolefin; preferably, 0.5 to 6%; more preferably, 1 to 4%, e.g. 2%.

Low molecular weight Butyl rubbers, i.e. Butyl rubbers having a viscosity average molecular weight of 5,000 to 85,000 and a mole percent unsaturation of 1 to 5%, may be sulfonated to produce the polymers useful in this invention. Preferably, these polymers have a viscosity average molecular weight of 25,000 to 60,000.

In the following discussion the low unsaturated elastomeric polymer is recited as EPDM. However, it should be understood that other unsaturated elastomeric polymers, such as Butyl rubber, are also inferred.

In carrying out the present invention, the EPDM elastomeric polymer is dissolved in a non-reactive solvent such as a chlorinated aliphatic hydrocarbon, a chlorinated aromatic hydrocarbon, an aromatic hydrocarbon or an aliphatic hydrocarbon. Examples of useful solvents, within the contemplation of this invention include carbon tetrachloride, dichloroethane, chlorobenzene, benzene, toluene, xylene, cyclohexane, pentane, isopentane, hexane, isohexane and heptane. Of these, the preferred solvents are aliphatic hydrocarbons and especially the lower boiling temperature aliphatic hydrocarbons.

A sulfonating agent is added to the solution of the elastomeric polymer and non-reactive solvent. The sulfonating agent is introduced at a temperature in the range of between −100° C. and 100° C. for a period of between 1 and 60 minutes. More preferably, the sulfonating agent is added for a period in the range of between 2 and 45 minutes at a temperature in the range of between 15° and 30° C. Most preferably, the sulfonating agent is added at a temperature in the range of between 20° C. and 25° C. for a period of time ranging between 5 and 30 minutes. Typical sulfonating agents, employed in the instant invention, are those described in U.S. Pat. Nos. 3,642,728 and 3,836,511 which have already been incorporated into this application by reference. Specifically, these sulfonating agents are selected from the group consisting of an acyl sulfate, a mixture of sulfuric acid and an acid anhydride and a complex of a sulfur trioxide and a Lewis base containing oxygen, sulfur or phosphorus. Typical sulfur trioxide donors are $SO_3$, chlorosulfonic acid, fluorosulfonic acid, sulfuric acid and oleum. Typical Lewis bases are: dioxane, tetrahydrofuran or triethylphosphate. Most preferred among the sulfonating agents for use in this invention is an acyl sulfate selected from the group consisting of benzoyl, acetyl, propionyl and butyryl sulfate. The acyl sulfate can be formed in situ in the reaction medium or pregenerated before its addition to the reaction medium.

The sulfonation reaction, wherein a sulfonating agent of the type recited above and EPDM are the reactants, results in a sulfonated EPDM terpolymer having between 10 and 50 milliequivalents of $SO_3H$ groups per 100 grams of EPDM. More preferably, there are between 15 and 45 meq. $SO_3H$ groups and, most preferably between 20 and 40 meq. of $SO_3H$ groups per 100 grams of EPDM. It is emphasized that neither the particular sulfonating agent used nor the manner of sulfonation is critical, provided that the sulfonating method does not degrade the polymeric backbone.

Neutralization of the acid form of the sulfonated EPDM terpolymer is preferentially accomplished by addition of a solution of a basic salt dissolved in a solvent system comprising an aliphatic alcohol, optionally containing some water, to the acid form of the sulfonated EPDM terpolymer. The cation of the basic salt is selected from ammonium, antimony, aluminum, lead, iron, a metal of Group IA, IIA, IB, or IIB of the Periodic Table of Elements and mixtures thereof. Of these cations zinc, magnesium and calcium are preferred and zinc is most preferred. The anion of the basic salt is selected from a carboxylic acid having from 1 to 4 carbon atoms, an hydroxide or alkoxide and mixtures thereof. A preferred neutralizing agent is a metal acetate. Of the metal acetates, zinc acetate is most preferred. Sufficient metal salt of the carboxylic acid is added to the solution of the acid form of the EPDM polymer to effect neutralization. It is preferable to neutralize at least 95% of the acid groups, more preferably 98% and most preferably 100%.

The neutralized sulfonated EPDM terpolymer cannot ordinarily be worked at conventional processing temperatures. However, certain compounds which act to disrupt the ionic crosslinkage of the neutralized sulfonated EPDM terpolymer act as plasticizers in that they permit the sulfonated polymer to be processed at conventional processing temperatures. Such plasticizers are termed "preferential plasticizers." These preferential plasticizers are so named because they "plasticize" the ionic bonding in preference to the polymeric substrate.

Preferential plasticizers preferred for use in this invention are selected from the group consisting of a basic salt of a carboxylic acid having from 2 to 30 carbon atoms, preferably from 5 to 22 carbon atoms, wherein a metal ion of such basic salt is selected from the group consisting of antimony, aluminum, iron, lead and a metal of Groups IA, IIA, IB or IIB of the Periodic Table of Elements and mixtures thereof. Among the preferred carboxylic acids, from which the salt is derived, are lauric, myristic, palmitic, stearic acids and mixtures thereof. Of these, stearic and lauric acids are most preferred. The most preferred metal ions of the basic salt are zinc and magnesium. The especially most preferred preferential plasticizer is zinc stearate.

Another preferred preferential plasticizer is an organic amide having the formula $R^1CONR^2R^3$ where $R^1$ is an aliphatic group and $R^2$ and $R^3$ are independently hydrogen, alkyl, aryl, aralkyl or $-CH_2CH_2NHCOR^1$ with the limitation that at least one of $R^1$, $R^2$ and $R^3$ has at least 5 carbon atoms. Examples of preferential plasticizers from among this class of organic amides are stearamide, ethylenebis(stearamide), ethylenebis(lauramide) and ethylenebis(hexanoamide).

The composition of this invention also includes a non-polar process oil. The non-polar process oil employed in this invention includes less than 4 weight percent polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point, as determined by the Cleveland open cup method, of at least 350° F., a pour point of less than 40° F., a viscosity in the range of between 70 and 3,000 SSU at 100° F. and a number average molecular weight in the range of between 300 and 1,000, more preferably between 300 and 750. Of these oils, paraffinics are most preferred.

Another component in the composition of this invention is carbon black. Carbon blacks range widely in physical and chemical properties. Physically, they vary in average particle size, particle size distribution, specific surface area, porosity of surface and the tendency of the individual primary particles to be associated in chain-like structure. Chemically, they vary in the population and nature of oxygenated structures which combine with their surface.

Although the invention is independent of the mechanism by which it provides the unexpected results obtained, it is theorized that the carbon black component is critical to the major applications to which the composition of this invention is proposed for use. A major application of the composition of this invention is in the production of roofing membranes. As those skilled in the art are aware an important requirement for use in this application is that the membrane possess outstanding weatherability. This characteristic can be correlated to the heat aging resistance of the membrane. Carbon black is an effective absorber of solar radiation. It is generally believed that carbon black almost totally converts solar radiation into heat energy.

The concentration of the carbon black employed in the composition of this invention is critical. The concentration of carbon black employed in the composition of this invention, always based on 100 parts by weight of the neutralized sulfonated elastomeric polymer, is at least 65 parts, which, it should be appreciated, in this specification means parts by weight. More preferably the carbon black concentration is in the range of between 65 and 200 parts. Still more preferably the carbon black concentration is in the range of 70 and 150 parts.

It is a unique feature of the composition of this invention that whereas the elastomeric polymers of the prior art use carbon black interchangeably with other mineral fillers, such as silica, talc, calcium carbonate, calcined clay, hydrated clay, and mixtures thereof, in this composition the presence of carbon black is critical. The carbon black concentration cannot be replaced with mineral fillers. Surprisingly, a heavy concentration of mineral filler is detrimental. The composition of this invention, indeed, cannot include mineral filler in a concentration of more than 25% by weight, based on the weight of carbon black. Preferably, the composition of this invention includes no more than 15% by weight mineral filler, based on the weight of carbon black. Still more preferably, the composition includes no mineral filler.

The carbon black employed in the composition of this invention preferably has a particle size of not more than 200 millimicrons. More preferably the particle size of the carbon black particles is in the range of between 10 and 100 millimicrons and most preferably, between 10 and 50 millimicrons.

Carbon blacks are currently classified in ASTM D-1765. Table 1 summarizes the principal commercially available carbon blacks according to their ASTM code, as set forth in ASTM D-1765, and their particle size.

TABLE 1

| ASTM No. | Particle Size, millimicrons |
|---|---|
| N 110 | 19 |
| N 219 | 21 |
| N 220 | 22 |
| N 231 | 21 |
| N 234 | 19 |
| N 326 | 26 |
| N 330 | 28 |
| N 339 | 26 |
| N 347 | 26 |
| N 358 | 29 |
| N 375 | 27 |
| N 472 | 38 |
| N 539 | 47 |
| N 550 | 47 |
| N 642 | 60 |
| N 650 | 52 |
| N 660 | 52 |
| N 754 | 70 |
| N 762 | 75 |
| N 765 | 70 |
| N 774 | 75 |
| N 990 | 330 |

Although all of these commercially available carbon blacks can be used in the composition of this invention, those numbered N100 to N899, having a particle size of less than 200 millimicrons are preferred. Those carbon blacks having an ASTM No. D-1765 between N100 and N799, having a particle size between 10 and 100 millimicrons are more preferred. Most preferred is carbon black ASTM D-1765 N100 to N599 having a particle size of between 10 and 50 millimicrons. It is emphasized that the preferred particle size range should not be interpreted as barring mixtures of different sized carbon blacks. In fact, a preferred embodiment of the composition of this invention includes different ASTM numbered carbon blacks having different particle sizes.

Other components may also be incorporated into the composition of this invention. Such a component, preferred for incorporation in the composition of this invention is an antioxidant. Antioxidants, useful in this composition, are selected from the group consisting of substituted aromatic amines, substituted phenols, aryl phosphites and metal dialkyl dithiocarbamates.

Specifically antioxidants that can be used in the composition of this invention include, but are not limited to, dioctyldiphenylamine, dinonyldiphenylamine, didodecyldiphenylamine, di(alpha-methylbenzyl)diphenylamine, di(alpha, alpha-dimethylbenzyl)diphenylamine, and various other alkyl or aralkyl substituted diphenylamines and mixtures thereof; also 2,2'-methylenebis(4-methyl-6-t-butylphenol), 2,2'-methylenebis(4-methyl-6-nonylphenol), styrenated phenol, polybutylated bisphenol A, tetrakis[methylene(3,5-di-t-butyl-4-hydroxyhydrocinnamate)]methane, octadecyl beta(3,5-di-t-butyl-4-hydroxyphenyl)propionate and various other substituted phenols and bis phenols; also tris(nonylphenyl)phosphite and other substituted aryl phosphites; also nickel dibutyldithiocarbamate, polymeric 1,2-dihydro-2,2,4-trimethylquinoline, mercaptobenzamidazole, alkylated mercaptobenzamidazole, and the zinc salt of mercaptobenzamidazole. Alkyl thiodipropionate synergists may also be employed in the antioxidant package.

Particularly preferred antioxidants for the composition of this invention are the alkyl and aralkyl diphenylamines.

The antioxidant, if present, is introduced in a concentration of from 0.05 to 5 parts by weight based on 100 parts of the neutralized sulfonated elastomeric polymer. More preferably, the antioxidant concentration is in the range of between 0.2 and 2.5 parts, most preferably, between 0.5 and 2.0 parts.

Another component which may be incorporated into the composition of this invention is a mineral filler. However, the amount of filler employable in the composition of this invention is limited to no more than 25% by weight of the carbon black present. That is, 0 to 25%, of a mineral filler selected from the group consisting of precipitated or ground silica, natural or synthetic talc, ground or precipitated calcium carbonate, calcined or hydrated clay and mixtures thereof may be present.

Yet another component that may be provided in the composition of this invention is an effective amount of a polyolefin thermoplastic. Polyolefin thermoplastics modify the hardness of the composition as well as modifying and improving its rheological properties. Among the polyolefins, polyethylene is preferred, with high density polyethylene most preferred.

Still another component that may be provided in the composition of this invention is a release agent. Release agents promote processability of the composition. They are especially useful when the composition is formed into a calendered sheet, a preferred shaped article made from the composition of this invention. Release agents within the contemplation of this invention include, but are not restricted to, primary and secondary amides, ethylenebis amides and waxes. The preferred class of release agents are primary amides. A particularly preferred release agent is erucamide.

Yet still another component optionally included in the composition of this invention is a microbiocide. This component is usefully added in those applications where the composition is employed in a climate conducive to infestation of fungi and other microorganisms. The preferred microbiocide is selected from the group consisting of 2,2'-thiobis(4,6-dichlorophenol), 10,10'-oxybisphenoarsine, 8-hydroxyquinoline and zinc dimethyldithiocarbamate.

The last preferred component that may be provided in the composition of this invention is at least one flame retardant. Flame retartants within the contemplation of this invention are those compounds whose use as flame retardants is well known to those skilled in the art. Examples of these known flame retardants are halogenated organic compounds, phosphorus containing compounds, antimony oxide and aluminum hydroxide.

An important characteristic of the composition of this invention is the concentrations of the constituent components. Because of the criticality of the carbon black its concentration has already been discussed. As for the remainder of the elastomeric composition of this invention, it comprises 100 parts of the neutralized sulfonated elastomeric polymer. (Again, it should be appreciated that whenever the term "parts" is recited, parts by weight are inferred.) The composition includes 5 to 50 parts of the preferential plasticizer. More preferably, the concentration of the preferential plasticizer is 10 to 50 parts. Most preferably, 15 to 30 parts of preferential plasticizer are included. The non-polar process oil is present in a concentration of from 40 to 250 parts. More preferably, the non-polar process oil comprises 60 to 150 parts, and most preferably, 65-100 parts.

The optionally added components, polyolefin thermoplastic, release agent, microbiocide and flame retardant, are each added in an effective amount sufficient to effectuate the specialized purpose of their addition.

The following examples are given to illustrate the instant invention. Since the purpose of the examples is illustrative, no implication should be drawn limiting the invention to the examples included herein.

EXAMPLE 1

In 640 parts by weight of dry hexane was dissolved 100 parts of an ethylene/propylene/ethylidene norbornene terpolymer (EPDM) having an ethylene content of 51%, a Mooney viscosity at 100° C. of 45 and an iodine number of 8. In a separate vessel, acetyl sulfate was prepared by mixing cold (20° C.) 4.6 parts of acetic anhydride and 3.1 parts of concentrated sulfuric acid. The acetyl sulfate was added to the hexane solution of the EPDM with continuous agitation. After 30 minutes mixing at ambient temperature, the solution was neutralized with a solution of 9.9 parts of zinc acetate dihydrate in 38 parts of methanol and 2.5 parts of water. After another 30 minutes mixing at ambient temperature, the EPDM zinc sulfonate was isolated by steam stripping off the solvent and drying the particulate product in a fluidized bed dryer.

EXAMPLE 2

An elastomeric composition was prepared by mixing 100 parts of the zinc sulfonated EPDM terpolymer (ZSEPDM), made in Example 1; 15 parts of zinc stearate; 50 parts of Tufflo (trademark) 6056, a paraffinic non-polar processing oil; 1 part of Naugard (trademark) 445, an alkylated diphenylamine antioxidant; and 75 parts of ASTM D-1765 N-339 carbon black in a "B" Banbury (trademark) mixer for 5 minutes at a temperature of 140° C. to produce a homogeneous mixture. The mixture was discharged into a 2-roll mill heated to a temperature of 110° C. whereby the mixture was sheeted. The sheet produced was then compression molded at 160° C. for 5 minutes to produce 1 inch by 3 inches by 0.06 inch plaques.

A plaque made in accordance with this procedure was tested to determine its tear strength. This test, which is referred to as split tear or trouser tear, measures tear strength in pounds per linear inch (pli), and was conducted in accordance with ASTM D-1938-67 except that the pull rate was 20 inches per minute rather than 10 inches per minute. The plaque of this composition had a tear strength of 330 pli, normalized to unit thickness.

This example, summarized below in Table 2, illustrates the excellent tear strength of the composition of this invention. By comparison commercial thermoset EPDM roofing membrane typically has a tear strength, as measured by modified ASTM test, in the range of 100 to 120 pli. This result establishes the excellent tear strength of the composition of this invention.

EXAMPLE 3

Example 2 was repeated but for the substitution of N550 carbon black for the N339 carbon black of Example 2. On testing, plaques made in accordance with this example possessed a tear strength of 240, well over the typical value for thermoset EPDM membranes used as roof coverings. This example is also summarized in Table 2.

COMPARATIVE EXAMPLES 1-4

Examples 2 and 3 were repeated except for the inclusion of a lesser amount of carbon black. That is, four compositions were prepared and tear tested employing carbon blacks N339 and N550 present in concentrations of 30 and 50 parts by weight. These examples, set forth in Table 2, provide tear strengths ranging from 40 to 80 pli, all of which results are below typical values for the competitive EPDM roof membrane.

TABLE 2

| Example No. | CE 1 | CE 2 | 2 | CE 3 | CE 4 | 3 |
|---|---|---|---|---|---|---|
| Constituents, parts | | | | | | |
| ZSEPDM | 100 | 100 | 100 | 100 | 100 | 100 |
| Zinc Stearate | 15 | 15 | 15 | 15 | 15 | 15 |
| Tufflo 6056 | 50 | 50 | 50 | 50 | 50 | 50 |
| Naugard 445 | 1 | 1 | 1 | 1 | 1 | 1 |
| N—339 Carbon Black | 30 | 50 | 75 | — | — | — |
| N—550 Carbon Black | — | — | — | 30 | 50 | 75 |
| Test Result | | | | | | |
| Tear Strength, pli per modified ASTM D-1938-67 | 65 | 80 | 330 | 40 | 65 | 240 |

The results summarized in Table 2 establish the criticality of employing at least 65 parts carbon black per 100 parts by weight of neutralized sulfonated polymer in the composition of this invention. At concentrations below 65 parts inadequate tear strength values are obtained. However, above 65 parts dramatic improvements, far in excess of typical acceptable values for thermoset EPDM, are noticed.

EXAMPLES 4-13 AND COMPARATIVE EXAMPLES 5-9

Fifteen compositions denoted Examples 4-13 and Comparative Examples 5-9 were prepared. They, in common, included 100 parts of ZSEPDM made in accordance with Example 1, 25 parts of zinc stearate, 75 parts of Sunpar (trademark) 2280, a paraffinic non-polar process oil and 1 part of Naugard (trademark) 445. They also included one of five carbon blacks: N110, N330, N550, N650 or N990. The five samples denoted Comparative Examples 5-9 included 50 parts of one of the five mentioned carbon blacks. (Since 50 parts is less than the minimum carbon black concentration, these examples are outside the scope of the composition of this invention and are thus denoted as comparative examples.) The ten examples within the scope of this invention included 100 or 150 parts of one of the above recited carbon blacks.

Compositions made in accordance with these examples were formed into 1 inch by 3 inches by 0.06 inch plaques and tested for tear strength (trouser tear) in accordance with the modified ASTM D-1938-67 as described in Example 2.

Additional plaques were compression molded from sheets formed from the fifteen compositions of Examples 4-13 and Comparative Examples 5-9 having the dimensions: 6 inches by 6 inches by 0.06 inch. These plaques were tested to determine their heat aging characteristics. The test employed was in accordance with ASTM D-573. In this test plaques were tested to determine their tensile strength in pounds per square inch (psi) and their elongation in percent (%) immediately after molding. The product of tensile strength and elongation of the unaged sample, $(TE)_{unaged}$, was calculated. Identical plaques were heat aged in a forced air oven, maintained at 116° C., for 7 days. The aged samples were identically tested to determine their tensile strength and elongation. This product, $(TE)_{aged}$, of tensile strength in psi and elongation in % was obtained. Then, the fractional strain energy, $(TE)_f$, was calculated. $(TE)_f$ was defined by the equation $$(TE)_f = (TE)_{aged}/(TE)_{unaged}.$$

Obviously the higher the fractional strain energy the greater the retention of physical properties after heat aging. Commercial thermoset EPDM roofing membrane typically has a fractional strain energy of 0.6 or higher.

The results of these examples appear in Table 3.

The criticality of carbon black concentration was again demonstrated in regard to trouser tear. All five carbon blacks when provided in a concentration of 50 parts per 100 parts of ZSEPDM produced unacceptably low values. All but three of the examples within the scope of this invention tested significantly above the typical thermoset EPDM values of 100 to 120 pli. Two examples, 150 parts of N550 and N650 gave anomolous results. It is believed that these results were due to carbon black dispersion problems encountered in these runs. Example 13, the sample employing 100 parts of N990 carbon black, yielded only a marginally acceptable value, illustrating the difficulties encountered in employing the less preferred large particle size carbon blacks. N990, as noted in Table 1, has a particle size in excess of 200 millimicrons, 330 millimicrons.

EXAMPLE 14

A composition was prepared which included 100 parts of ZSEPDM formulated in accordance with claim 1; 25 parts of zinc stearate; 75 parts of Sunpar (trademark) 2280 non-polar process oil; 60 parts of N110 carbon black; 30 parts of N550 carbon black; 14.6 parts of Marlex (trademark) BX 672 high density polyethylene; and 1.5 parts of Naugard (trademark) 445 antioxidant.

The composition was formed into plaques having the dimensions, 6 inches by 6 inches by 0.06 inch, in accordance with the procedure of Example 2. A 3 inch×0.5 inch×0.06 inch section of these plaques was subjected to a flex cracking heat aging test. In this test the plaque sections were kept in a forced air oven, maintained at 116° C. Once a day the plaque sections were removed from the oven, allowed to cool to room temperature and then folded over themselves, that is, flexed, once. If the sample returned to its original shape it was returned to the oven and the procedure was repeated 24 hours later. The number of days required before the section cracked is reported. Obviously, the greater the number of days reported cracking the more heat resistant is the composition.

This test is still going on. As of this writing the sample of this example has withstood cracking for 330 days.

This example demonstrates the effectiveness of a particularly preferred embodiment of the instant invention.

TABLE 3

| EXAMPLE NO. | CE 5 | 4 | 5 | CE 6 | 6 | 7 | CE 7 | 8 | 9 | CE 8 | 10 | 11 | CE 9 | 12 | 13 |
|---|---|---|---|---|---|---|---|---|---|---|---|---|---|---|---|
| Constituents, parts | | | | | | | | | | | | | | | |
| ZSEPDM | 100 | 100 | 100 | 100 | 100 | 100 | 100 | 100 | 100 | 100 | 100 | 100 | 100 | 100 | 100 |
| Zinc Stearate | 25 | 25 | 25 | 25 | 25 | 25 | 25 | 25 | 25 | 25 | 25 | 25 | 25 | 25 | 25 |
| Sunpar 2280 | 75 | 75 | 75 | 75 | 75 | 75 | 75 | 75 | 75 | 75 | 75 | 75 | 75 | 75 | 75 |
| Naugard 445 | 1 | 1 | 1 | 1 | 1 | 1 | 1 | 1 | 1 | 1 | 1 | 1 | 1 | 1 | 1 |
| N110 Carbon Black | 50 | 100 | 150 | — | — | — | — | — | — | — | — | — | — | — | — |
| N330 Carbon Black | — | — | — | 50 | 100 | 150 | — | — | — | — | — | — | — | — | — |
| N550 Carbon Black | — | — | — | — | — | — | 50 | 100 | 150 | — | — | — | — | — | — |
| N650 Carbon Black | — | — | — | — | — | — | — | — | — | 50 | 100 | 150 | — | — | — |
| N990 Carbon Black | — | — | — | — | — | — | — | — | — | — | — | — | 50 | 100 | 150 |
| Results | | | | | | | | | | | | | | | |
| Trouser Tear, pli (modified ASTM D-1938-67) | 50 | 350 | 300 | 70 | 300 | 310 | 70 | 260 | 40 | 40 | 280 | 60 | 30 | 100 | 160 |
| Fractional Strain Energy $(TE)_f$ | .76 | .94 | .68 | 1.01 | .92 | .60 | .82 | 1.09 | .84 | .86 | .81 | .73 | 1.02 | .77 | .86 |

It is noted that all the examples, including those outside the scope of the invention, the comparative examples, produced fractional strain energy values of at least 0.6, comparable to the typical values for commercially useful thermoset EPDM roofing membrane.

EXAMPLES 15-18

Four additional compositions were prepared into plaques of the type defined in Example 14. These compositions, formulated in accordance with the procedure of Example 2 had the constituents tabulated below in Table 4. The plaques were subjected to the same flex test procedure described in Example 14. As stated above, this test represents an excellent heat age testing of roofing materials in that it closely emulates actual roof conditions, albeit, more stringent than usual atmospheric conditions. Table 4 is as follows:

TABLE 4

| Example No | 15 | 16 | 17 | 18 |
|---|---|---|---|---|
| Constituent, parts | | | | |
| ZSEPDM | 100 | 100 | 100 | 100 |
| Zinc Stearate | 35 | 35 | 35 | 35 |
| Tufflo 6056 | 75 | 75 | 75 | 75 |
| Irganox 1010* | 0.5 | 0.5 | 0.5 | 0.5 |
| N 110 Carbon Black | 70 | — | — | — |
| N 339 Carbon Black | — | 70 | — | — |
| N 550 Carbon Black | — | — | 70 | — |
| N 990 Carbon Black | — | — | — | 70 |
| Result | | | | |
| Days to Flex Test Failure | 171 | 133 | 120 | 84 |

*Irganox (trademark) 1010 is a substituted phenol antioxidant.

These tests illustrate the effectiveness of the compositions of this invention as an effective long term resistor of heat aging. It also illustrates the greater effectiveness of smaller particle size carbon black in that the smaller the particle size carbon black used in the composition the more resistant to flex crack heat aging was the plaque made from that composition. It is emphasized, however, that all four compositions provided acceptable results.

COMPARATIVE EXAMPLES 10-12

Three additional examples were run representing plaques made from a composition incorporating all the constituents and amounts of the composition of Examples 15-18 except for the carbon black. Each of the three compositions of these examples included 10 parts by weight of N550 carbon black. In addition the three compositions included 60 parts of a mineral filler. The fillers employed were HiSil (trademark) 233, an ultra small particle sized, precipitated silica, Imsil (trademark) A-108, ground silica and Mistron Vapor (trademark) magnesium silicate, a synthetic talc.

These samples were heat aged tested in accordance with the flex cracking test described in Examples 15-18.

Table 5 summarizes these comparison examples including the results of the flex cracking tests. For comparison purposes Example 16 is included.

TABLE 5

| Example No. | 16 | CE 10 | CE 11 | CE 12 |
|---|---|---|---|---|
| Constituents, parts by Wt | | | | |
| ZSEPDM | 100 | 100 | 100 | 100 |
| Zinc Stearate | 35 | 35 | 35 | 35 |
| Tufflo 6056 | 75 | 75 | 75 | 75 |
| Irganox 1010 | 0.5 | 0.5 | 0.5 | 0.5 |
| N550 Carbon Black | 70 | 10 | 10 | 10 |
| HiSil 233 | — | 60 | — | — |
| Imsil A-108 | — | — | 60 | — |
| Mistron Vapor | — | — | — | 60 |
| Result | | | | |
| Days to Flex Failure | 120 | 16 | 40 | 46 |

The results of this test establish the criticality of the presence of the carbon black constituent. It, furthermore, establishes the requirement that mineral fillers, if present, cannot exceed 25% by weight based on the weight of carbon black.

The preceding preferred embodiments and examples are given to illustrate the scope and spirit of this invention. These embodiments and examples will make apparent to those skilled in the art other embodiments and examples within the scope of the instant invention. These other embodiments and examples are within the contemplation of the present invention. Thus, the instant invention should be limited only by the appended claims.

What is claimed is:

1. An elastomeric composition comprising:
   100 parts of a neutralized sulfonated elastomeric polymer containing 10 to 50 milliequivalents neutralized sulfonate groups per 100 grams of elastomeric polymer, said neutralized sulfonate groups containing a cation selected from the group consisting of ammonium, antimony, aluminum, iron, lead, a metal of Group IA, IIA, IB or IIB of the Periodic Table of Elements and mixtures thereof;
   40 to 250 parts of a non-polar process oil;
   5 to 50 parts of a preferential plasticizer selected from the group consisting of a basic salt of a carboxylic acid having 2 to 30 carbon atoms, said salt containing a cation selected from the group consisting of antimony, aluminum, iron, lead, a metal of Group IA, IIA, IB or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group $-CH_2CH_2NHCOR^1$, and where at least one of $R^1$, $R^2$ and $R^3$ has at least 5 carbon atoms; and
   at least 65 parts of carbon black;
   all said parts being by weight.

2. A composition in accordance with claim 1 comprising 0 to 25% by weight, based on the weight of said carbon black, of a mineral filler, said filler selected from the group consisting of silica, talc, calcium carbonate, calcined clay, hydrated clay and mixtures thereof.

3. A composition in accordance with claim 1 including 0.05 to 5 parts of an antioxidant, said antioxidant selected from the group consisting of substituted aromatic amines, substituted phenols, aryl phosphites and metal dialkyl dithiocarbamates.

4. A composition in accordance with claim 1 wherein said neutralized sulfonated elastomeric polymer is derived from a low unsaturated polymer selected from the group consisting of EPDM and Butyl rubber.

5. A composition in accordance with claim 4 wherein said low unsaturated polymer is EPDM.

6. A composition in accordance with claim 1 wherein said carbon black has a particle size of less than 200 millimicrons.

7. A composition in accordance with claim 6 wherein said carbon black is present in a concentration of between 65 and 200 parts.

8. A composition in accordance with claim 7 wherein said carbon black has a particle size in the range of between 10 and 100 millimicrons.

9. A composition in accordance with claim 1 comprising an effective amount of a polyolefin thermoplastic.

10. A composition in accordance with claim 1 comprising an effective amount of a release agent, and release agent selected from the group consisting of primary amides, secondary amides, ethylenebis amides and waxes.

11. A composition in accordance with claim 1 comprising an effective amount of a microbiocide.

12. A composition in accordance with claim 1 comprising an effective amount of at least one flame retardant, said flame retardant selected from the group consisting of halogenated organic compounds, phosphorus containing compounds, antimony oxide and aluminum hydroxide.

13. An elastomeric composition comprising:
100 parts of a neutralized sulfonated EPDM polymer containing 10 to 50 milliequivalents of neutralized sulfonate groups per 100 grams of EPDM polymer, said neutralized sulfonate groups containing a cation selected from the group consisting of ammonium, antimony, aluminum, iron, lead, a metal of Group IA, IIA, IB or IIB of the Periodic Table of Elements and mixtures thereof;
60 to 150 parts of a non-polar process oil;
10 to 50 parts of a preferential plasticizer selected from the group consisting of a basic salt of a carboxylic acid having 2 to 30 carbon atoms, and salt containing a cation selected from the group consisting of antimony, aluminum, iron, lead, a metal of Group IA, IIA, IB or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group —$CH_2CH_2NHCOR^1$ and where at least one of $R^1$, $R^2$ and $R^3$ has 5 carbon atoms; and
65 to 200 parts of carbon black;
all said parts being by weight.

14. A composition in accordance with claim 13 comprising 0 to up to 25% by weight, based on the weight of said carbon black, of a mineral filler, said filler selected from the group consisting of silica, talc, calcium carbonate, calcined clay, hydrated clay and mixtures thereof.

15. A composition in accordance with claim 14 wherein said composition includes no mineral filler.

16. A composition in accordance with claim 13 wherein said cation of said neutralized sulfonate groups is selected from the group consisting of zinc, magnesium and calcium.

17. A composition in accordance with claim 13 wherein said preferential plasticizer is said basic salt of said carboxylic acid wherein said metal ion of said basic salt is selected from the group consisting of zinc and magnesium and said carboxylic acid is selected from the group consisting of lauric, myristic, palmitic, stearic and mixtures thereof.

18. A composition in accordance with claim 17 wherein said preferential plasticizer is zinc stearate.

19. A composition in accordance with claim 13 wherein said carbon black has a particle size of less than 200 millimicrons.

20. A composition in accordance with claim 19 wherein said carbon black has a particle size of between 10 and 100 millimicrons.

21. A composition in accordance with claim 20 wherein said carbon black is present in a concentration in the range of 65 and 200 parts.

22. A composition in accordance with claim 21 wherein said carbon black is present in a concentration in the range of 70 and 150 parts.

23. A composition in accordance with claim 22 wherein said carbon black has a particle size range of between 10 and 50 millimicrons.

24. A composition in accordance with claim 13 comprising 0.05 to 5 parts of an antioxidant selected from the group consisting of substituted aromatic amines, substituted phenols, aryl phosphites and dithiocarbamates.

25. An elastomeric composition comprising:
100 parts of a neutralized sulfonated EPDM polymer containing 10 to 50 milliequivalents of neutralized sulfonate groups per 100 grams of EPDM polymer, said neutralized sulfonate groups containing a zinc cation;
60 to 150 parts of a non-polar process oil;
15 to 30 parts of zinc stearate;
70 to 150 parts of carbon black having a particle size in the range of between 10 and 100 millimicrons;
0.2 to 2.5 parts of an antioxidant selected from the group consisting of substituted aromatic amines, substituted phenols, aryl phosphites and metal dialkyl dithiocarbamates;
all said parts being by weight.

26. An elastomeric composition in accordance with claim 25 comprising an effective amount of polyethylene thermoplastic.

* * * * *